US012773713B2

(12) United States Patent
Sakakibara et al.

(10) Patent No.: US 12,773,713 B2
(45) Date of Patent: Oct. 27, 2026

(54) EXHAUST GAS-PURIFYING CATALYST-MANUFACTURING APPARATUS

(71) Applicant: CATALER CORPORATION, Kakegawa (JP)

(72) Inventors: Keisuke Sakakibara, Kakegawa (JP); Yoshio Nakamura, Kakegawa (JP); Katsuyoshi Sudo, Kakegawa (JP); Kazuki Ichikawa, Kakegawa (JP)

(73) Assignee: CATALER CORPORATION, Shizuoka (JP)

(*) Notice: Subject to any disclaimer, the term of this patent is extended or adjusted under 35 U.S.C. 154(b) by 341 days.

(21) Appl. No.: 18/743,521

(22) Filed: Jun. 14, 2024

(65) Prior Publication Data

US 2024/0326082 A1 Oct. 3, 2024

Related U.S. Application Data

(63) Continuation of application No. PCT/JP2022/044002, filed on Nov. 29, 2022.

(30) Foreign Application Priority Data

Jan. 7, 2022 (JP) ................................ 2022-001523

(51) Int. Cl.
*B01J 37/02* (2006.01)
*B01J 35/57* (2024.01)
(Continued)

(52) U.S. Cl.
CPC ................ *B05C 5/02* (2013.01); *B01J 35/57* (2024.01); *B01J 37/02* (2013.01); *B01J 37/0215* (2013.01);
(Continued)

(58) Field of Classification Search
None
See application file for complete search history.

(56) References Cited

U.S. PATENT DOCUMENTS

| | | | | |
|---|---|---|---|---|
| 3,948,213 A * | 4/1976 | Hoyer | B01J 37/0215 | 118/428 |
| 11,654,425 B2 * | 5/2023 | Burgess | B01J 37/0215 | 427/230 |

(Continued)

FOREIGN PATENT DOCUMENTS

| | | |
|---|---|---|
| CN | 103386391 A | 11/2013 |
| CN | 108290149 A | 7/2018 |

(Continued)

OTHER PUBLICATIONS

Chinese official action dated May 30, 2026 in connection with Chinese Application No. 2022800879308.

(Continued)

*Primary Examiner* — Binu Thomas
(74) *Attorney, Agent, or Firm* — John P. White

(57) ABSTRACT

An exhaust gas-purifying catalyst-manufacturing apparatus includes a holder holding a honeycomb substrate in an upright state; a guide member including a cylindrical portion inserted into an upper opening of a cylindrical body to be spaced apart from the honeycomb structure and the cylindrical body, having a first flow path allowing a supply of a coating liquid through the cylindrical portion to an upper surface of the honeycomb structure, and forming a second flow path allowing a supply of gas via a gap between the cylindrical portion and the cylindrical body to the upper surface of the honeycomb structure; a supplier supplying the coating liquid to the guide member; and a suction device sucking gas from a lower end of the cylindrical body.

5 Claims, 13 Drawing Sheets

(51) Int. Cl.

| | |
|---|---|
| ***B05C 5/02*** | (2006.01) |
| ***B05C 7/04*** | (2006.01) |
| ***B05C 11/10*** | (2006.01) |
| ***B05C 13/00*** | (2006.01) |

(52) U.S. Cl.
CPC ............ *B05C 7/04* (2013.01); *B05C 11/1002* (2013.01); *B05C 13/00* (2013.01)

(56) References Cited

U.S. PATENT DOCUMENTS

| | | | | |
|---|---|---|---|---|
| 2009/0155475 | A1 | 6/2009 | Goshima et al. | |
| 2017/0274412 | A1 | 9/2017 | Sekine et al. | |
| 2018/0250630 | A1* | 9/2018 | Fukuyo ................ | B01J 37/0225 |
| 2021/0086133 | A1* | 3/2021 | Kido ........................ | B01J 37/02 |
| 2025/0289029 | A1* | 9/2025 | Ohara ...................... | B01J 37/02 |

FOREIGN PATENT DOCUMENTS

| | | | |
|---|---|---|---|
| CN | 109908968 | A | 6/2019 |
| CN | 111013938 | A | 4/2020 |
| JP | 2000-197840 | A | 7/2000 |
| JP | 2014-076415 | A | 5/2014 |
| JP | 2018-103106 | A | 7/2018 |
| JP | 2018-103131 | A | 7/2018 |
| JP | 2018-153720 | A | 10/2018 |
| WO | WO 2007/007370 | A1 | 1/2007 |
| WO | WO 2010/114132 | A1 | 10/2010 |
| WO | WO 2018/020777 | A1 | 2/2018 |

OTHER PUBLICATIONS

English translation of International Search Report, issued Jan. 31, 2023 in connection with PCT International Application No. PCT/JP2022/044002.

International Preliminary Report on Patentability dated Jul. 18, 2024 in connection with International Application No. PCT/JP2022/044002.

* cited by examiner

EXHAUST GAS-PURIFYING CATALYST-MANUFACTURING APPARATUS

CROSS-REFERENCE TO RELATED APPLICATION

This application is a Continuation Application of PCT Application No. PCT/JP2022/044002, filed Nov. 29, 2022 and based upon and claiming the benefit of priority from Japanese Patent Application No. 2022-001523, filed Jan. 7, 2022, the entire contents of all of which are incorporated herein by reference.

FIELD

The present invention relates to manufacture of an exhaust gas-purifying catalyst.

BACKGROUND

In the manufacture of an exhaust gas-purifying catalyst, for example, a slurry containing a catalytic metal or the like is sometimes applied to a wall of a honeycomb substrate to form a catalytic layer on the wall of the honeycomb substrate. Patent Literature 1 describes an example of a manufacturing apparatus that performs such coating. In this manufacturing apparatus, first, a guide member is disposed at an upper end of the upright honeycomb substrate to form a liquid reservoir together with an upper end surface of the honeycomb substrate. Next, the slurry is supplied to the liquid reservoir, and gas in the honeycomb substrate is sucked out from the lower end side of the honeycomb substrate. In this way, the slurry is allowed to enter through holes of the honeycomb substrate to coat the wall of the honeycomb substrate with the slurry.

CITATION LIST

Patent Literature

Patent Literature 1: International Publication No. 2010/114132

SUMMARY

There is a honeycomb substrate having a cylindrical body and a honeycomb structure disposed in its center section. The present inventors have found that if the slurry is applied to the wall of such a honeycomb substrate by the above-described method, a coating layer is formed not only on the wall of the honeycomb structure but also on a part of the region of the inner surface of the cylindrical body between the upper opening of the cylindrical body and the honeycomb structure. Therefore, an object of the present invention is to provide a technique capable of making a coating layer difficult to form in a vicinity of an opening of a cylindrical body.

According to an aspect of the present invention, there is provided an exhaust gas-purifying catalyst-manufacturing apparatus for forming a catalytic layer on a honeycomb substrate, the honeycomb substrate including a cylindrical body and a honeycomb structure, the honeycomb structure being disposed in a center section of the cylindrical body and including a plurality of holes each extending in an axial direction of the cylindrical body, the manufacturing apparatus comprising: a holder configured to hold the honeycomb substrate in an upright state; a guide member including a cylindrical portion inserted into an opening of the cylindrical body positioned above the honeycomb structure such that the guide member is spaced apart from the honeycomb structure and the cylindrical body, the guide member having a first flow path allowing a supply of a coating liquid through an internal space of the cylindrical portion to an upper surface of the honeycomb structure, and the guide member forming a second flow path allowing a supply of gas via a gap between the cylindrical portion and the cylindrical body to the upper surface of the honeycomb structure; a supplier configured to supply the coating liquid to the guide member; a suction device configured to suck out gas in the honeycomb substrate from a lower end of the cylindrical body; and a controller controlling operations of the supplier and the suction device such that the supplier supplies the coating liquid to the guide member and the suction device sucks out the gas in the honeycomb substrate from the lower end of the cylindrical body when the cylindrical portion is inserted in the opening of the cylindrical body.

According to another aspect of the present invention, there is provided a manufacturing apparatus according to the above aspect, further comprising a compressed-gas supplier supplying compressed gas to the second flow path.

According to still another aspect of the present invention, there is provided a manufacturing apparatus according to any one of the above aspects, wherein the guide member further includes a flange portion protruding outward from an upper portion of the cylindrical portion, and a lower surface of the flange portion faces an upper end surface of the cylindrical body with a gap therebetween when the cylindrical portion is inserted in the opening of the cylindrical body.

According to still another aspect of the present invention, there is provided a manufacturing apparatus according to any one of the above aspects, wherein the guide member further includes a diameter-enlarged portion, the diameter-enlarged portion being provided above the cylindrical portion, enlarged in diameter upward, and guiding the coating liquid into the cylindrical portion.

According to still another aspect of the present invention, there is provided a manufacturing apparatus according to any one of the above aspects, further comprising a lifting device configured to raise and lower the guide member, wherein the controller controls operations of the lifting device, the supplier, and the suction device such that the supplier supplies the coating liquid to the guide member and the suction device sucks out the gas in the honeycomb substrate from the lower end of the cylindrical body in a state in which the lifting device has stopped raise and lowering of the guide member.

According to the present invention, a technique capable of making a coating layer difficult to form in a vicinity of an opening of a cylindrical body is provided.

DETAILED DESCRIPTION

Figure 1:
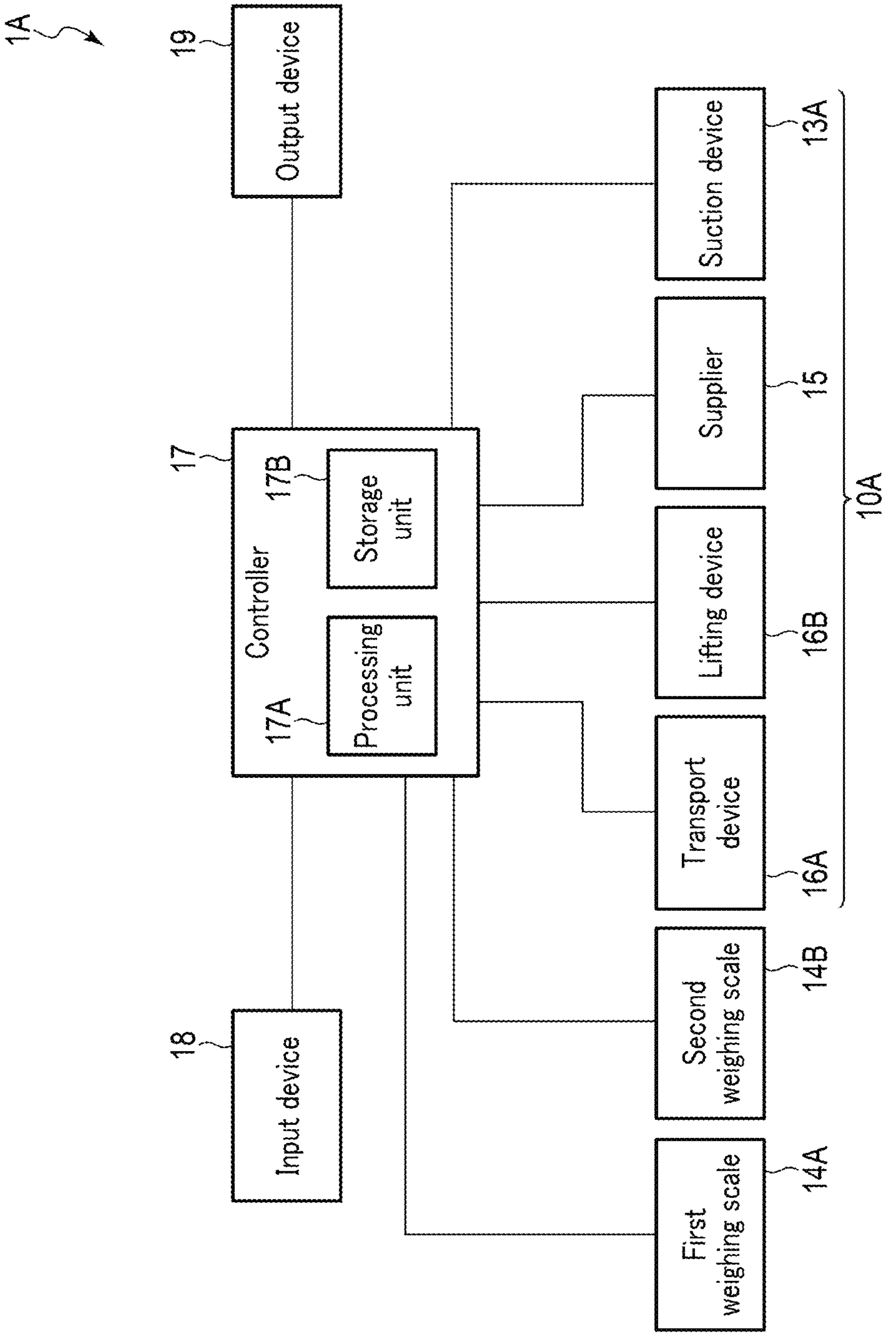
FIG. 1 is a block diagram of a manufacturing apparatus according to the first embodiment of the present invention.

Hereinafter, embodiments according to the present invention will be described with reference to the drawings. In the embodiments described below, any one of the above aspects is further embodied. The matters described below can be incorporated into each of the aspects alone or in combination. In addition, the following embodiments exemplify a configuration for embodying the technical idea of the present invention, and the technical idea of the present invention is not limited by the material, shape, structure, and the like to be described below. Various modifications can be made to the technical idea of the present invention within the technical scope defined by the claims described in CLAIMS.

Note that elements having the same or similar functions are denoted by the same reference symbols in the drawings to be referred to below, and redundant description will be omitted. In addition, the drawings are schematic, and a relationship between a dimension in a certain direction and a dimension in another direction, a relationship between a dimension of a certain member and a dimension of another member, and the like may be different from actual ones.

<1> First Embodiment

<1.1> Manufacturing Apparatus

Figure 2:
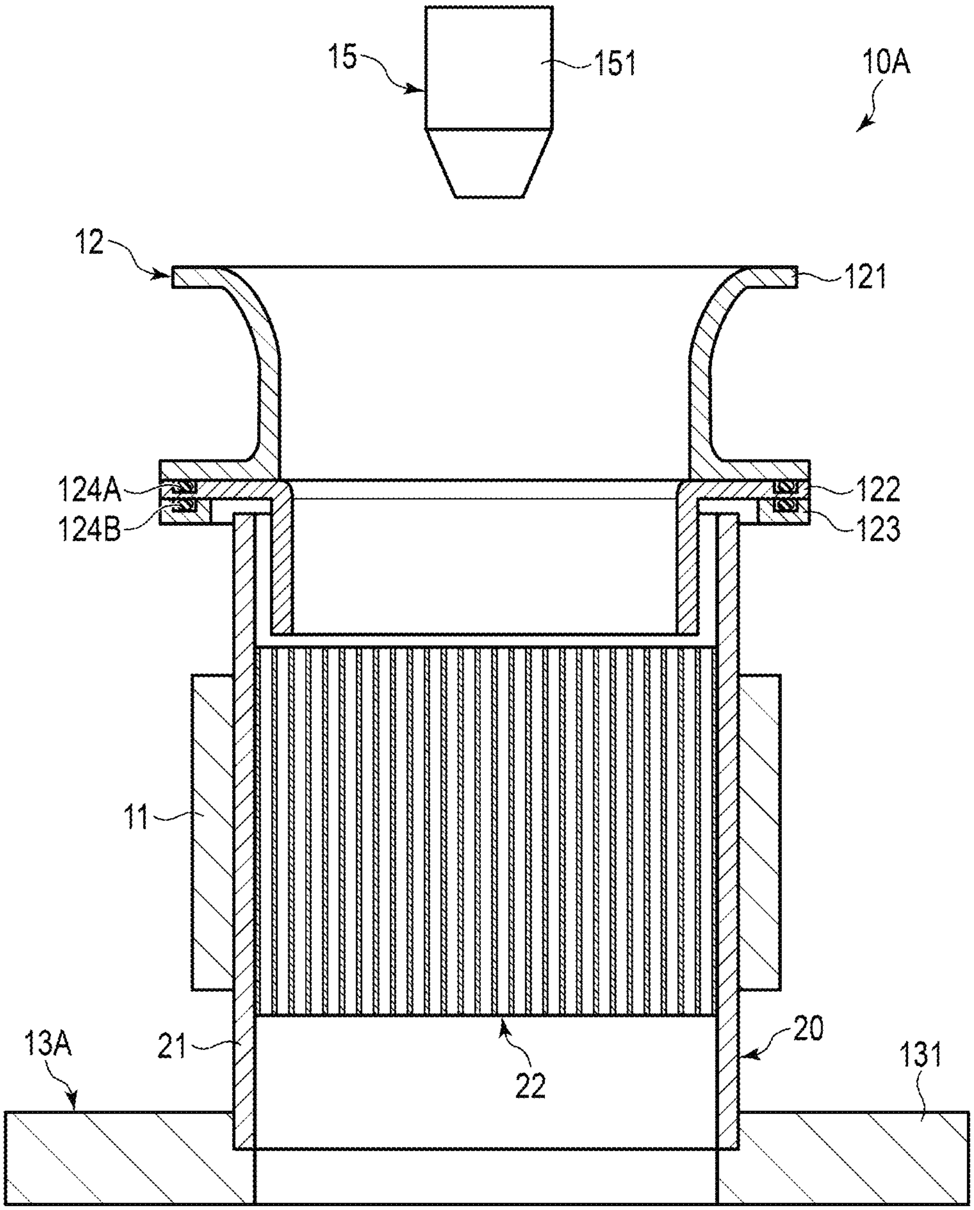
FIG. 2 is a cross-sectional view of a coating device included in the manufacturing apparatus of FIG. 1.
Figure 3:
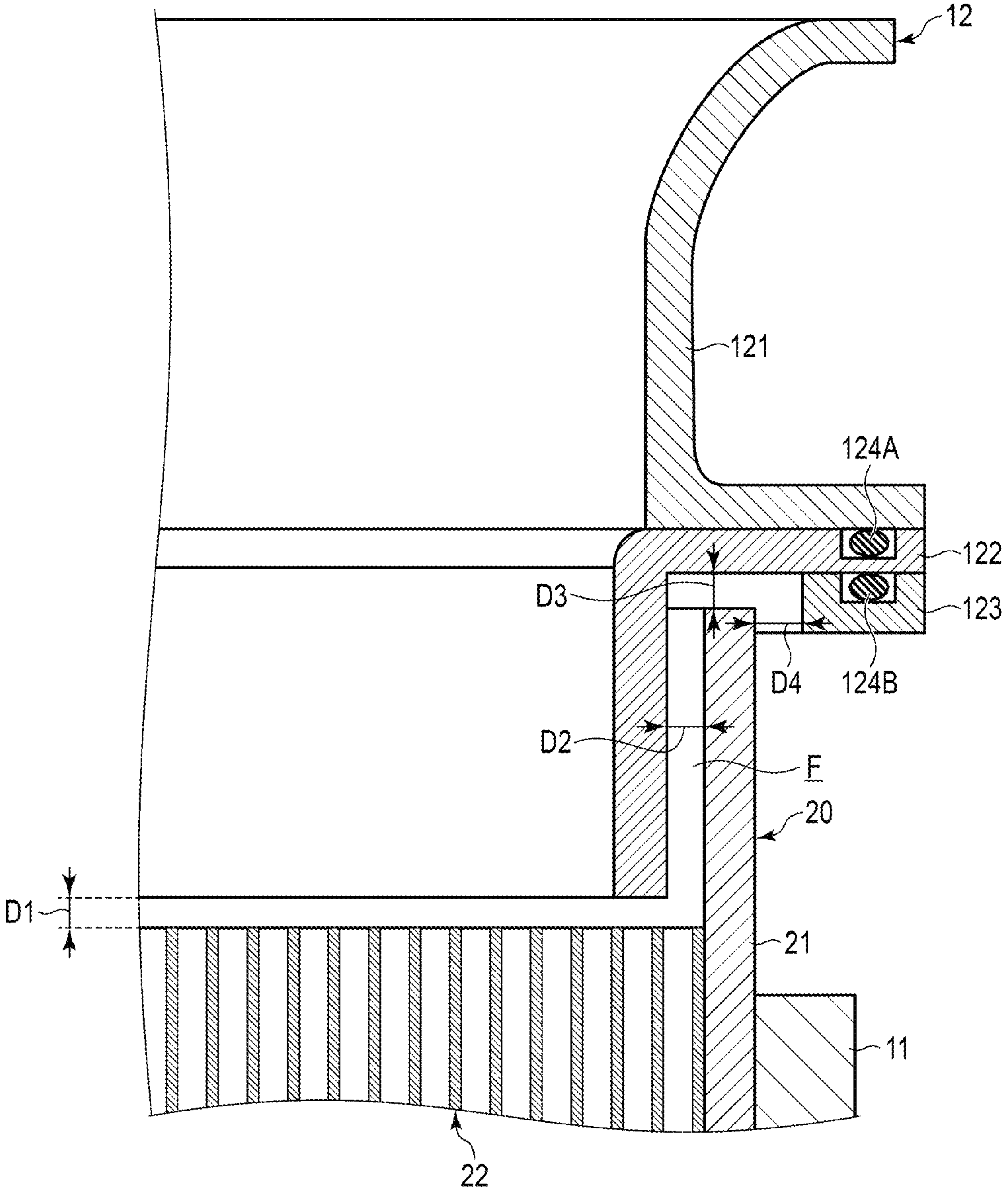
FIG. 3 is a partially enlarged cross-sectional view of the coating device of FIG. 2.

FIG. 1 is a block diagram of a manufacturing apparatus according to the first embodiment of the present invention. FIG. 2 is a cross-sectional view of a coating device included in the manufacturing apparatus of FIG. 1. FIG. 3 is a partially enlarged cross-sectional view of the coating device of FIG. 2.

A manufacturing apparatus 1A shown in FIG. 1 is an apparatus for manufacturing an exhaust gas-purifying catalyst. The manufacturing apparatus 1A includes a coating device 10A, a first weighing scale 14A, a second weighing scale 14B, a controller 17, an input device 18, and an output device 19.

The coating device 10A coats a honeycomb structure 22 of a honeycomb substrate 20 shown in FIGS. 2 and 3 with a coating liquid.

Herein, the honeycomb substrate 20 includes a cylindrical body 21 and the honeycomb structure 22.

The cylindrical body 21 has a circular cylindrical shape. The cylindrical body 21 may have another cylindrical shape such as an elliptic cylindrical shape or an oval cylindrical shape. The cylindrical body 21 is made of, for example, metal.

The cylindrical body 21 has a maximum outer diameter, for example, in a range of 33 to 89.5 mm. The cylindrical body 21 has an axial dimension, i.e., a length, for example, in a range of 50 to 160 mm.

The honeycomb structure 22 is disposed in a center section of the cylindrical body 21. That is, the honeycomb structure 22 is spaced apart from one opening of the cylindrical body 21 and is also spaced apart from the other opening of the cylindrical body 21.

The honeycomb structure 22 has an outer shape substantially equal to that of the center section in the cylindrical body 21. The honeycomb structure 22 has a plurality of holes each extending in the axial direction of the cylindrical body 21. The holes allow ventilation between adjacent spaces with the honeycomb structure 22 interposed therebetween.

The honeycomb structure 22 is made of, for example, metal. In this case, the honeycomb structure 22 may have a structure in which, for example, a laminate of a flat plate and a corrugated plate is wound multiple times in a wave arrangement direction. Such a honeycomb structure 22 may have gaps between the flat plate and the corrugated plate as through holes.

The honeycomb structure 22 has a dimension in the axial direction of the cylindrical body 21, for example, in a range of 40 to 150 mm. The distance from the honeycomb structure 22 to each opening of the cylindrical body 21 is, for example, in a range of 5 to 10 mm.

The coating device 10A includes, as shown in FIG. 2, a holder 11, a guide member 12, a supplier 15, and a suction device 13A. The coating device 10A further includes a transport device 16A and a lifting device 16B shown in FIG. 1.

The holder 11 holds the honeycomb substrate 20 in a detachable manner. The holder 11 holds, as shown in FIG. 2, the honeycomb substrate 20 in an upright state between a connection member 131 described later and the supplier 15. That is, the holder 11 holds the honeycomb substrate 20 between the connection member 131 and the supplier 15 so that the axial direction of the cylindrical body 21 coincides with the gravity direction.

The holder 11 is, for example, a mechanical chuck that grips the honeycomb substrate 20. The holder 11 may be another chuck device, for example, a vacuum chuck that holds the honeycomb substrate 20 by using negative pressure, or a magnet chuck that holds the honeycomb substrate 20 by using magnetism.

The holder 11 is vertically movable between the connection member 131 described later and the supplier 15. The holder 11 is also movable between the coating device 10A and the first weighing scale 14A and between the coating device 10A and the second weighing scale 14B. Herein, the holder 11 is a part of the transport device 16A.

The transport device 16A moves the holder 11 between the coating device 10A and the first weighing scale 14A and between the coating device 10A and the second weighing scale 14B. The transport device 16A allows, together with the holder 11, transport of the honeycomb substrate 20 from the first weighing scale 14A to the coating device 10A, and transport of the honeycomb substrate 20 from the coating device 10A to the second weighing scale 14B. Herein, the transport device 16A includes the holder 11. The transport device 16A may further include a motor. According to an example, the transport device 16A includes the holder 11 and a robot arm that supports the holder 11 at its distal end to be vertically movable.

The guide member 12 includes, as shown in FIGS. 2 and 3, a first member 121, a second member 122, a third member 123, and seal materials 124A and 124B. The guide member 12 further includes a fixing member (not shown).

The first member 121 includes a diameter-enlarged portion having a cylindrical shape with a diameter enlarged on one end side, and a first flange portion protruding outward from the other end of the diameter-enlarged portion. The first member 121 is made of, for example, metal.

The second member 122 includes a cylindrical portion, and a second flange portion protruding outward from one end of the cylindrical portion. The cylindrical portion has an outer diameter smaller than an inner diameter of the cylindrical body 21. The second member 122 is made of, for example, metal.

The third member 123 is a plate having an opening at the center. The third member 123 has an inner diameter larger than the outer diameter of the cylindrical body 21. The third member 123 is made of, for example, metal. By changing the thickness of the third member 123, distances D1 and D3 described later can be adjusted.

The first member 121 and the second member 122 are abutted against each other so that the first flange portion and the second flange portion are in contact with each other. The third member 123 faces the first flange portion with the second flange portion interposed therebetween. The fixing member fixes the first member 121, the second member 122, and the third member 123 together. The first flange portion and the second flange portion constitute a flange portion.

The seal materials 124A and 124B are herein O-rings. Grooves are annularly provided on a surface of the second flange portion in contact with the first flange portion and a surface of the third member 123 in contact with the second flange portion. The seal materials 124A and 124B are respectively provided in the groove provided in the second flange portion and the groove provided in the third member 123.

As described above, the guide member 12 includes the cylindrical portion as a part of the second member 122, the diameter-enlarged portion as a part of the first member 121, and the flange portion configured by the first flange portion and the second flange portion. The guide member 12 is disposed so that the diameter-enlarged portion is positioned above the cylindrical portion. The flange portion protrudes outward from the upper portion of the cylindrical portion. The lower surface of the flange portion faces the upper end surface of the cylindrical body 21 with a gap therebetween in a second state described later. The diameter-enlarged portion is provided above the cylindrical portion and is enlarged in diameter upward. The diameter-enlarged portion guides the coating liquid into the cylindrical portion. In the diameter-enlarged portion, the inner diameter at the upper end and the inner diameter at the lower end are larger than the inner diameter of the cylindrical portion. The inner diameter of the lower end of the diameter-enlarged portion may be equal to the inner diameter of the cylindrical portion.

The lifting device 16B raises and lowers the guide member 12. The lifting device 16B is, for example, an electric lifting device including a motor. The lifting device 16B may be a hydraulic lifting device including a pump.

The lifting device 16B may raise the guide member 12 to a sufficient height so that the honeycomb substrate 20 is not brought into contact with the guide member 12 when the transport device 16A transports the honeycomb substrate 20 from the first weighing scale 14A to the coating device 10A and transports the honeycomb substrate 20 from the coating device 10A to the second weighing scale 14B. In a case where the transport device 16A positions the honeycomb substrate 20 on the connection member 131, the lifting device 16B can lower the guide member 12 so that the cylindrical portion is inserted into the upper opening of the cylindrical body 21 while the guide member 12 is spaced apart from the honeycomb structure 22 and the cylindrical body 21. Hereinafter, a state in which the position of the guide member 12 is highest is referred to as a first state, and a state in which the position of the guide member 12 is lowest is referred to as a second state.

The lifting device 16B further includes a positioning member with which the lower surface of the third member 123 comes into contact in the second state. With such a positioning member, it is possible to improve a positional accuracy of the guide member 12 in the vertical direction in the second state. Furthermore, with such a positioning member, distances D1 and D3 can be adjusted by the third member 123.

In the second state, as shown in FIGS. 2 and 3, the cylindrical portion of the guide member 12 is inserted in the opening of the cylindrical body 21 positioned above the honeycomb structure 22 so as to be spaced apart from the honeycomb structure 22 and the cylindrical body 21. The guide member 12 includes a first flow path, and forms a second flow path in the second state.

The first flow path allows supply of the coating liquid through the inside of the cylindrical portion to the upper surface of the honeycomb structure 22. Herein, the first flow path is formed of the internal space of the first member 121 and the internal space of the second member 122.

The second flow path allows supply of gas to the upper surface of the honeycomb structure 22 through a gap F between the cylindrical portion and the cylindrical body 21. Herein, the second flow path is formed of a space sandwiched between the cylindrical portion of the guide member 12 and the inner surface of the cylindrical body 21, a space sandwiched between the flange portion of the guide member 12 and the upper end surface of the cylindrical body 21, and a space sandwiched between the third member 123 and the outer surface of the cylindrical body 21.

In the second state, a distance D1 from the cylindrical portion of the guide member 12 to the honeycomb structure 22 is preferably in a range of 1 to 3 mm, and more preferably in a range of 1 to 2 mm. Shortening the distance D1 makes a coating layer difficult to form in the vicinity of the upper opening of the cylindrical body 21. However, if the distance D1 is shortened, it may be difficult to supply a sufficient amount of the coating liquid to the peripheral portion of the upper end surface of the honeycomb structure 22.

In the second state, a distance D2 from the cylindrical portion of the guide member 12 to the inner surface of the cylindrical body 21 is preferably in a range of 0.5 to 1.5 mm, more preferably in a range of 1 to 1.5 mm. Shortening the distance D2 makes a coating layer difficult to form in the vicinity of the upper opening of the cylindrical body 21. However, shortening the distance D2 requires a higher positioning accuracy for the guide member 12 in the second state. If the distance D2 is excessively shortened, an airflow AF4 described later is weakened, and the effect of suppressing the formation of the coating layer in the vicinity of the upper opening of the cylindrical body 21 may be reduced.

A distance D3 from the flange portion of the guide member 12 to the upper end surface of the cylindrical body 21 and a distance D4 from the third member 123 to the outer surface of the cylindrical body 21 are each arbitrary. According to an example, the distances D3 and D4 are each equal to the distance D2 or larger than the distance D2.

The supplier 15 supplies the coating liquid to the guide member 12. The supplier 15 includes a tank (not shown), a metering pump (not shown), a liquid feed pipe (not shown), and a nozzle head 151.

The tank contains the coating liquid.

The coating liquid is a raw material of a catalytic layer to be formed on the wall of the honeycomb structure 22 or a part thereof, and is a solution or a slurry. The coating liquid is, for example, a solution containing a catalytic metal, a slurry containing at least one of a heat-resistant support and a promoter, or a slurry containing a catalyst metal and at least one of a heat-resistant support and a promoter. In the slurry containing a catalytic metal and at least one of a heat-resistant support and a promoter, the catalytic metal may be dissolved in a dispersion medium, may be dispersed in a dispersion medium, or may be supported on at least one of a heat-resistant support and a promoter.

The catalytic metal is, for example, a platinum-group metal such as platinum, palladium, and rhodium; another transition metal such as iron and copper; an alkali metal such as lithium and potassium; an alkaline earth metal such as barium; or two or more thereof.

The heat-resistant support is, for example, a fire-resistant inorganic oxide such as alumina. The promoter is, for example, an oxygen storage material such as ceria and a ceria-zirconia composite oxide; a nitrogen oxide ($NO_x$) storage material containing an alkali metal; a hydrocarbon adsorbent such as zeolite; or two or more thereof.

The dispersion medium is, for example, water. The dispersion medium may be an organic solvent or a mixture of an organic solvent and water.

The coating liquid may further contain an additive, for example, a thickener such as hydroxyethyl cellulose, a dispersion stabilizer, and a binder. If the coating liquid contains a thickener such as hydroxyethyl cellulose, the concentration thereof is preferably in a range of 0.3 to 1% by mass.

The coating liquid preferably has a viscosity E1 in a range of 1500 to 3500 cps and a viscosity E100 in a range of 80 to 250 cps. Here, the viscosities E1 and E100 are measured by using a commercially available shear viscometer under a temperature environment of 25° C.

By increasing the viscosity of the coating liquid, the liquid absorption of the honeycomb structure 22 by the capillary phenomenon is suppressed, and the coating liquid is easily spread to the edge of the upper end surface of the honeycomb structure 22. However, increasing the viscosity of the coating liquid may require a stronger suction force of the suction device 13A.

The metering pump is connected to the tank and one end of the liquid feed pipe. The metering pump measures a given amount of the coating liquid out of the tank and discharges it to one end of the liquid feed pipe. The metering pump is, for example, a reciprocating pump such as a piston pump and a plunger pump.

A nozzle head 151 is connected to the other end of the liquid feed pipe. The nozzle head 151 discharges a given amount of the coating liquid into the guide member 12 when the metering pump is driven.

The suction device 13A includes a vacuum pump (not shown) and the connection member 131. The connection member 131 is made of, for example, metal. The connection member 131 has a hollow structure and has an opening connected to the vacuum pump and an opening provided in an upper portion. The upper portion of the connection member 131 has a recessed edge along the opening, and the recess forms a step around the opening. When the transport device 16A places the honeycomb substrate 20 in the upper portion of the connection member 131, the lower end surface of the cylindrical body 21 comes into contact with the step. The suction device 13A sucking out gas, for example, air, in the honeycomb substrate 20 when the vacuum pump is driven in this state.

The first weighing scale 14A measures a mass $M_s1$ of the honeycomb substrate 20 before the coating by the coating device 10A.

The second weighing scale 14B measures a total mass $M_s2$ of the honeycomb substrate 20 after the coating by the coating device 10A.

The controller 17 includes a processing unit 17A and a storage unit 17B.

The processing unit 17A includes a central processing unit (CPU). The storage unit 17B is connected to the processing unit 17A. The storage unit 17B includes a nonvolatile memory that stores programs read by the processing unit 17A and data supplied from the processing unit 17A.

The controller 17 is connected to the suction device 13A, the first weighing scale 14A, the second weighing scale 14B, the supplier 15, the transport device 16A, the lifting device 16B, the input device 18, and the output device 19. The controller 17 controls the operations of the suction device 13A, the supplier 15, the transport device 16A, the lifting device 16B, and the output device 19 based on commands and information input by an operator via the input device 18, signals output by the first weighing scale 14A and the second weighing scale 14B, and the like.

The input device 18 is a human interface device for an operator to input commands and information to the controller 17. The input device is, for example, one or more of a button, a keyboard, a mouse, a touch panel, and a voice input device.

The output device 19 outputs warning information that can be recognized by the operator. The output device 19 is, for example, one or more of a display, a warning lamp, a voice guidance device, and a buzzer. The display is, for example, a liquid crystal display or an organic electroluminescent display. The warning lamp includes, for example, a light emitting diode.

<1.2> Manufacturing Method

With the above-described manufacturing apparatus 1A, for example, it is possible to manufacture an exhaust gas-purifying catalyst by the following method.

Figure 4:
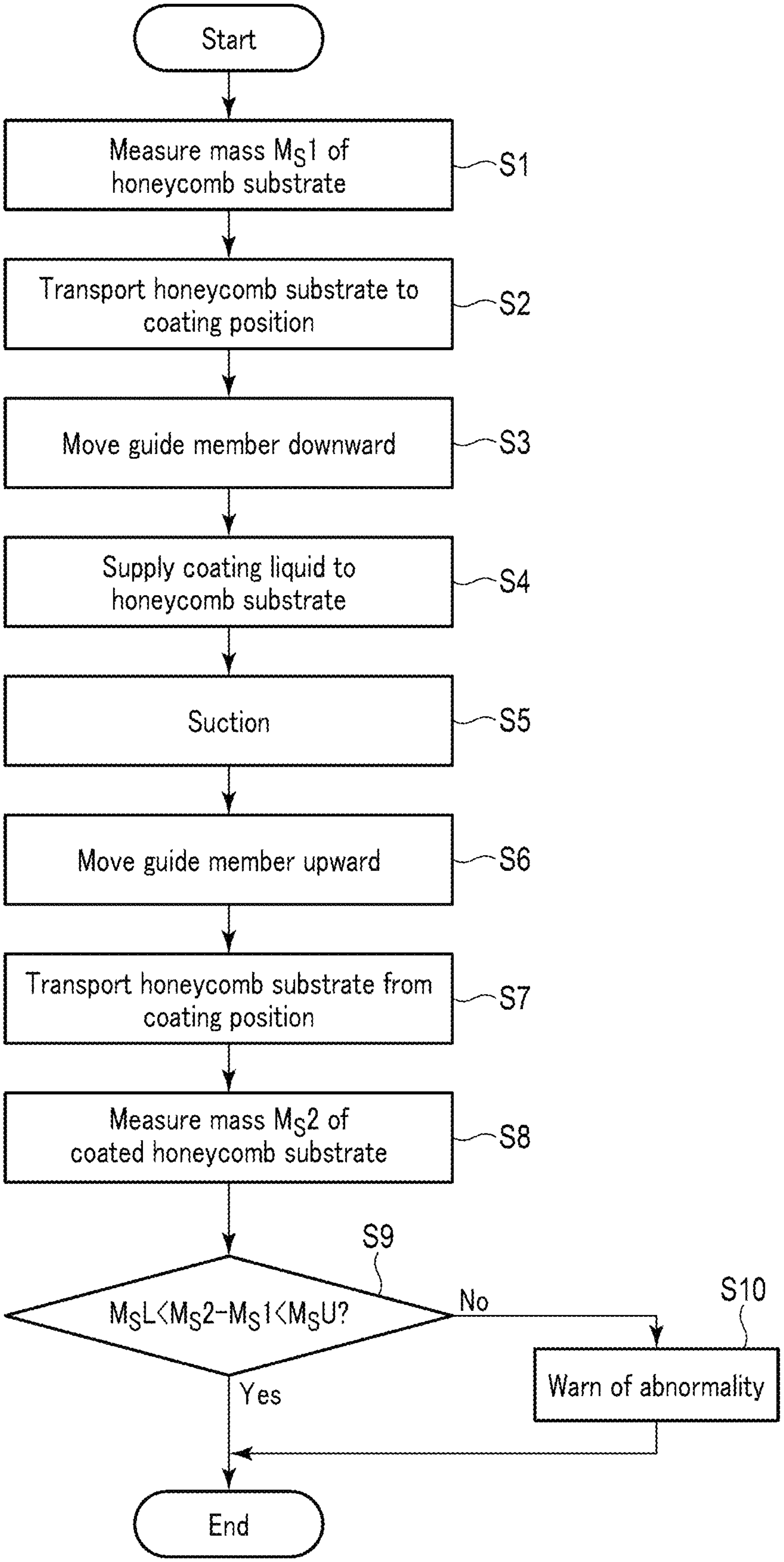
FIG. 4 is a flowchart showing a manufacturing method according to the first embodiment of the present invention.
Figure 5:
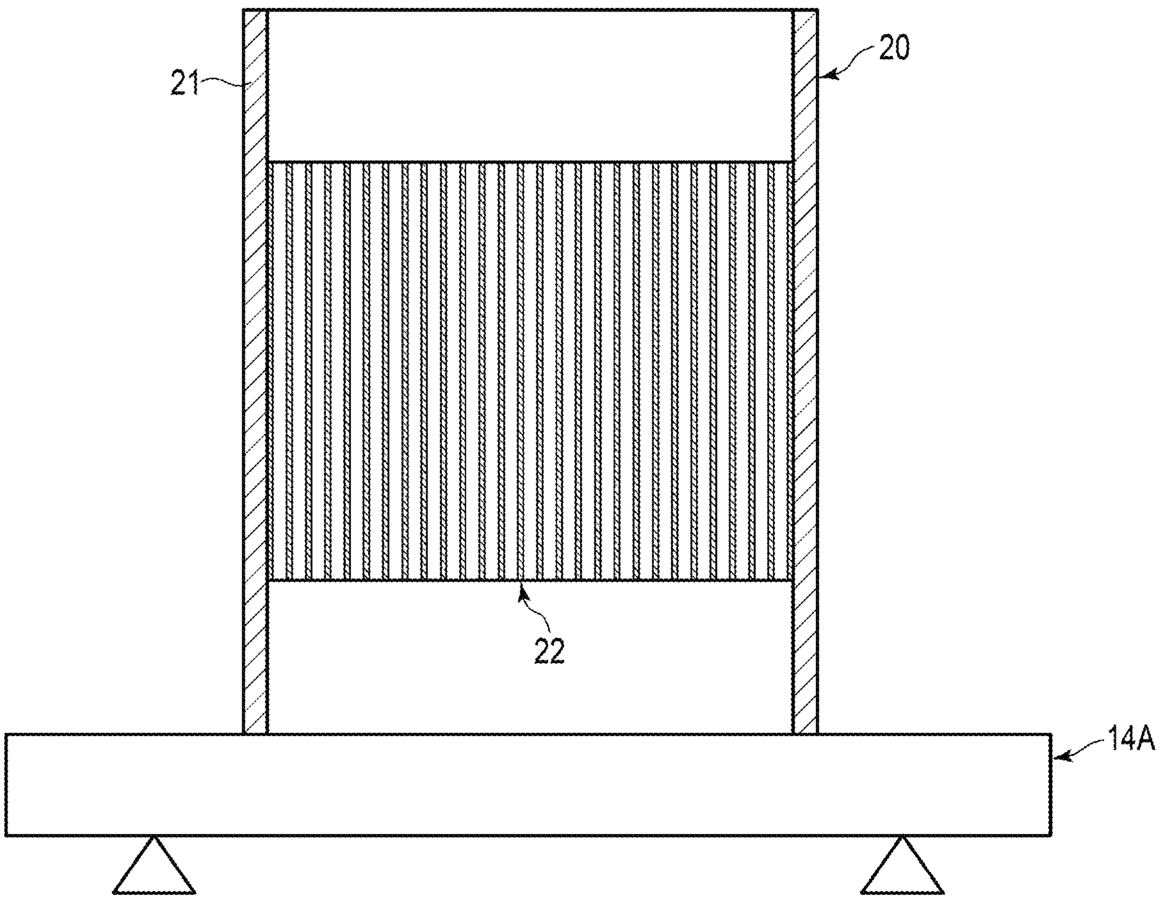
FIG. 5 is a cross-sectional view showing a first mass measuring step.
Figure 6:
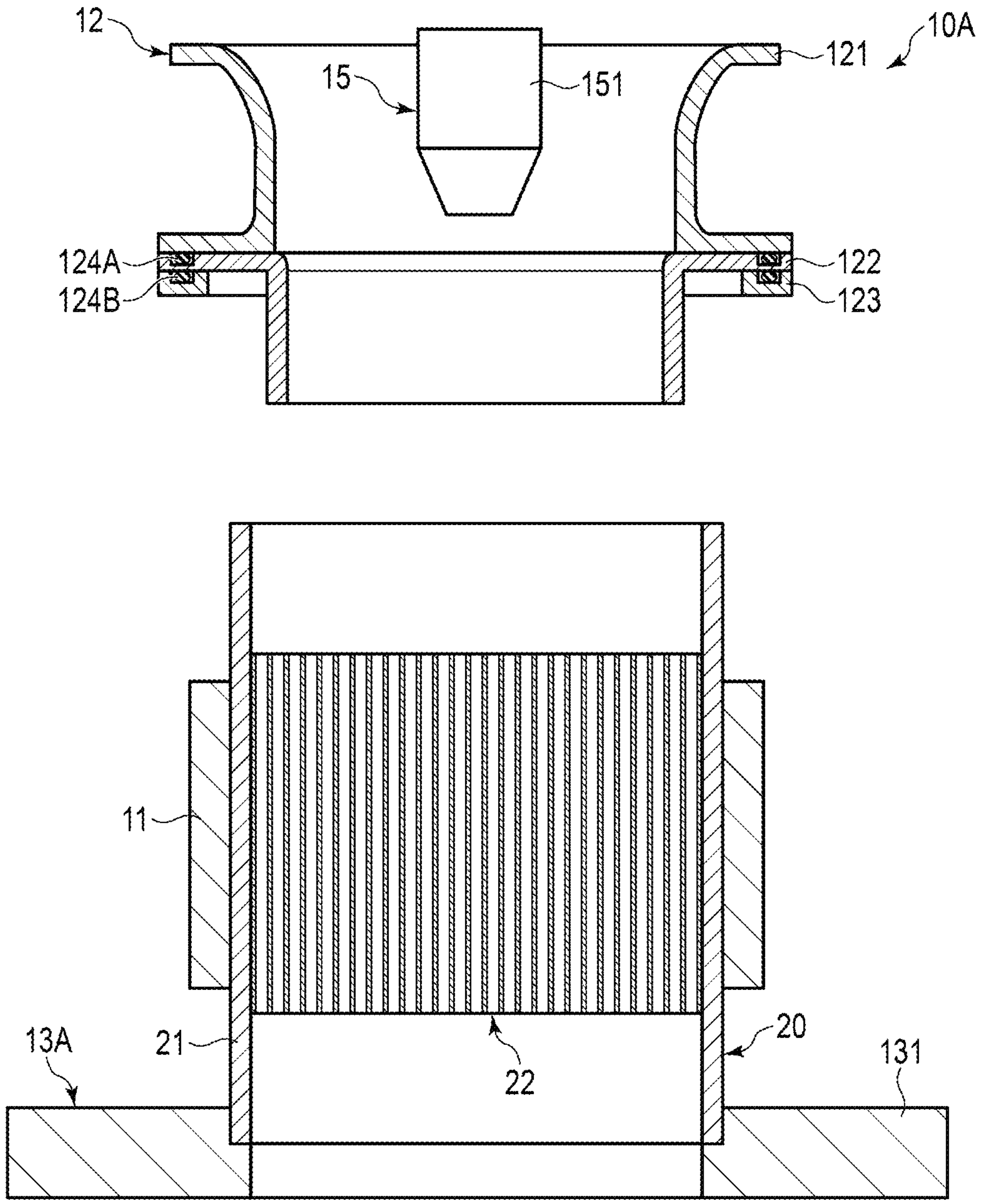
FIG. 6 is a cross-sectional view showing a transport step.
Figure 7:
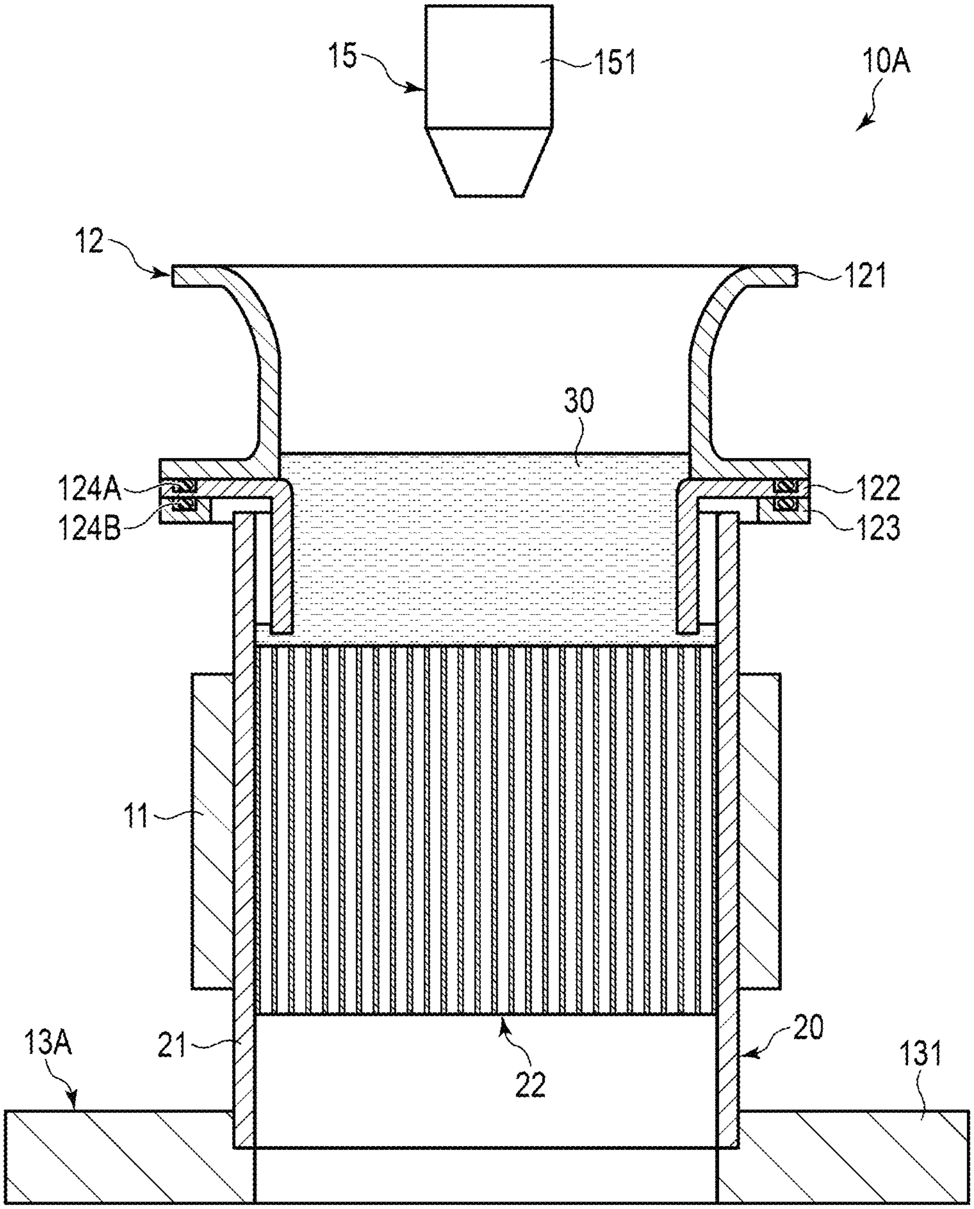
FIG. 7 is a cross-sectional view showing a state in which a coating liquid supply step is started.
Figure 8:
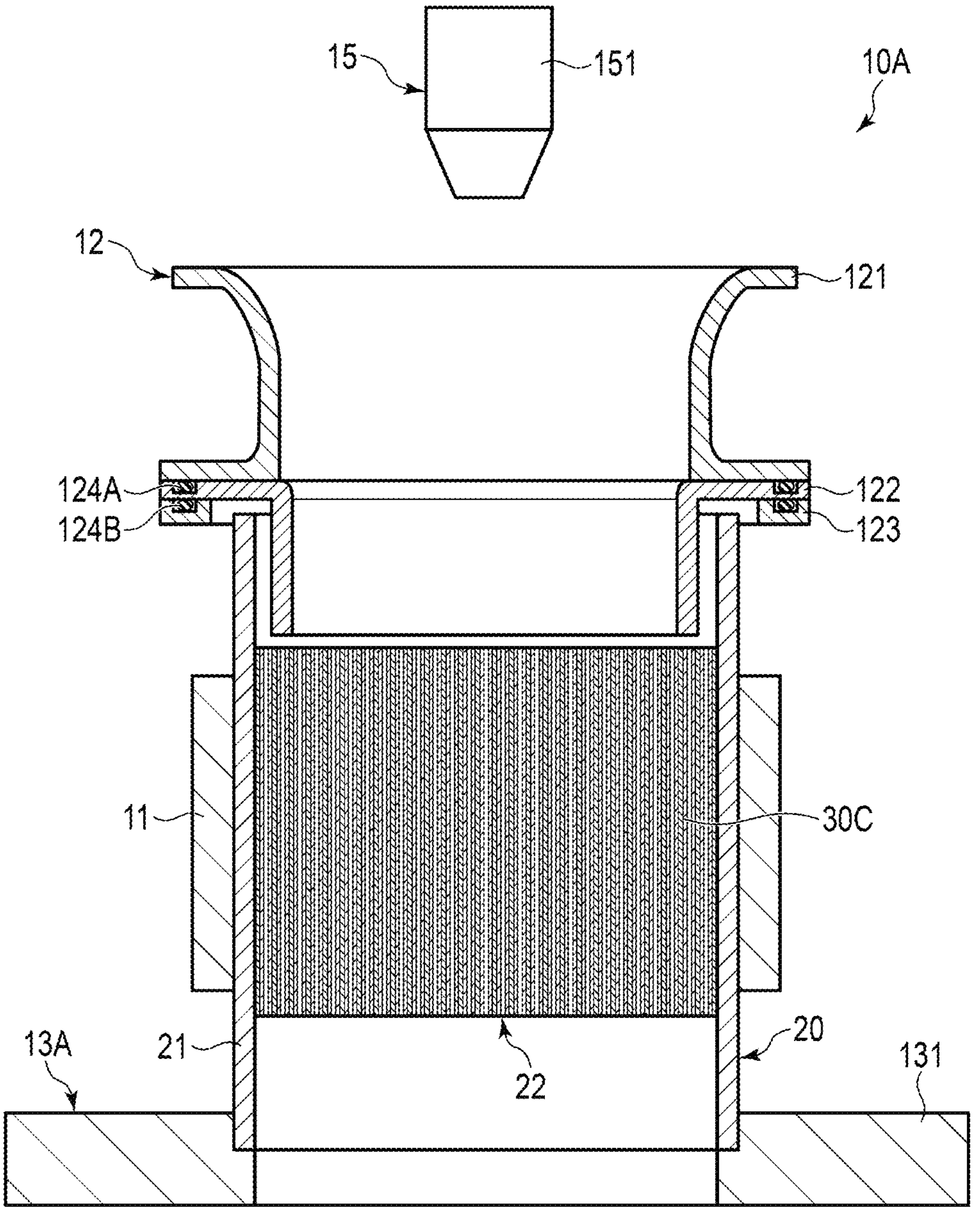
FIG. 8 is a cross-sectional view showing a suction step.
Figure 9:
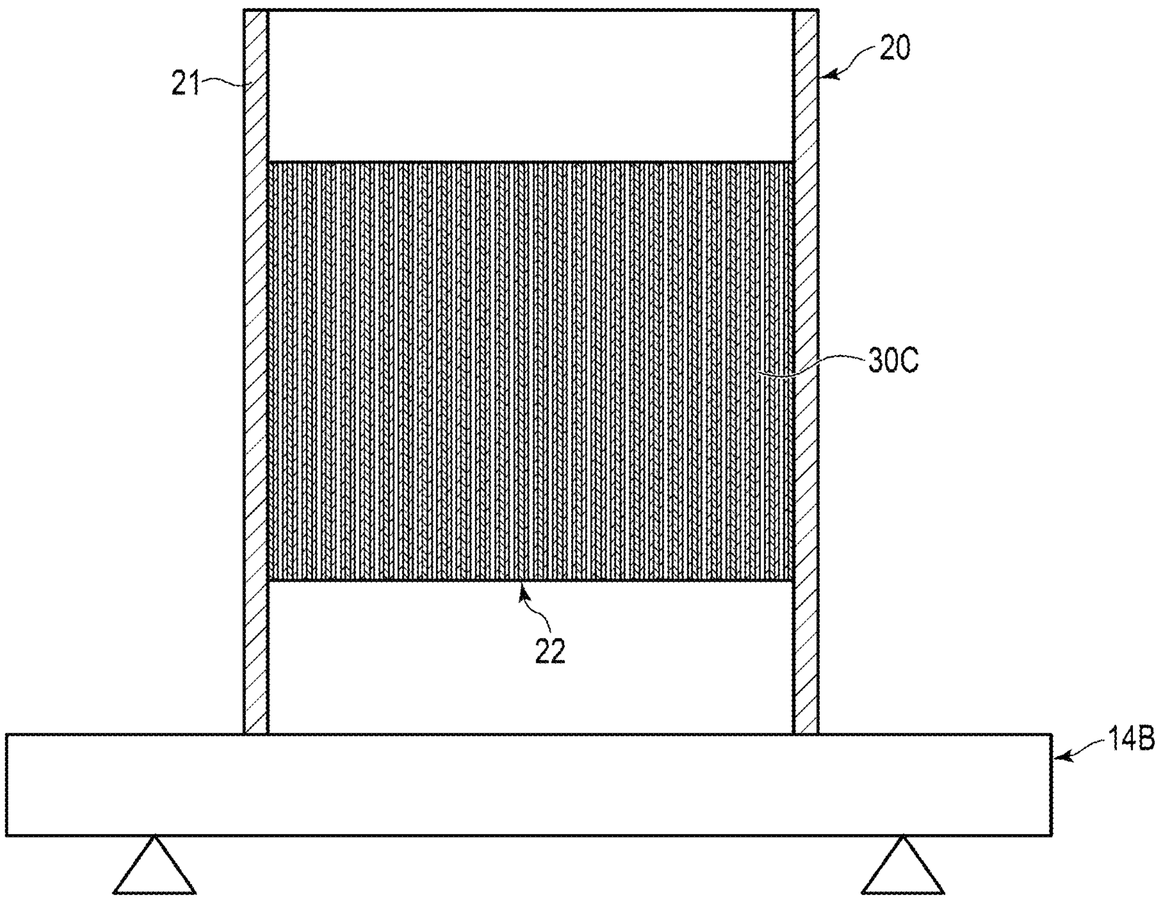
FIG. 9 is a cross-sectional view showing a second mass measuring step.

FIG. 4 is a flowchart showing a manufacturing method according to the first embodiment of the present invention. FIG. 5 is a cross-sectional view showing a first mass measuring step. FIG. 6 is a cross-sectional view showing a transport step. FIG. 7 is a cross-sectional view showing a state in which a coating liquid supply step is started. FIG. 8 is a cross-sectional view showing a suction step. FIG. 9 is a cross-sectional view showing a second mass measuring step.

In the method described herein, first, an operator inputs a command to start manufacturing to the controller 17 via the input device 18. At this time, the operator can further input information on the number of exhaust gas-purifying catalysts to be manufactured and the like to the controller 17 via the input device 18.

Next, the operator places, as shown in FIG. 5, the honeycomb substrate 20 on a weighing pan of the first weighing scale 14A. The first weighing scale 14A measures a mass $M_s1$ of the honeycomb substrate 20 (step S1). The first weighing scale 14A outputs a signal corresponding to the measurement result to the controller 17.

The controller 17 determines from the signal output from the first weighing scale 14A that the honeycomb substrate 20 is placed on the weighing pan of the first weighing scale 14A. The controller 17 then stores the mass $M_s1$ of the honeycomb substrate 20 measured by the first weighing scale 14A.

Next, the controller 17 controls the operation of the transport device 16A so that the holder 11 is moved from the coating device 10A or the second weighing scale 14B to the first weighing scale 14A and the holder 11 holds the honeycomb substrate 20 there. Subsequently, the controller 17 controls the operation of the transport device 16A so that the holder 11 is moved from the first weighing scale 14A to the coating device 10A and the lower end surface of the honeycomb substrate 20 held by the holder 11 comes into contact with the step around the opening provided in the upper portion of the connection member 131 as shown in FIG. 6. The honeycomb substrate 20 is thus transported to the coating position on the connection member 131 (step S2).

Next, the controller 17 controls the operation of the lifting device 16B so that the guide member 12 is moved downward (step S3). Specifically, the controller 17 controls the operation of the lifting device 16B so that the guide member 12 is moved from the first position to the second position.

Next, the controller 17 controls the operation of the supplier 15 so that the nozzle head 151 discharges a predetermined amount of the coating liquid 30. At this time, the cylindrical portion of the guide member 12 is inserted in the upper opening of the cylindrical body 21. Therefore, the coating liquid 30 discharged from the nozzle head 151 is accumulated, as shown in FIG. 7, in a liquid reservoir formed by the guide member 12 and the upper surface of the honeycomb structure 22, and a part of the coating liquid 30 spreads to the peripheral portion of the upper surface of the honeycomb structure 22 through the gap between the cylindrical portion of the guide member 12 and the upper surface of the honeycomb structure 22. In this manner, the supplier 15 supplies the coating liquid 30 to the honeycomb substrate 20 (step S4).

Next, the controller 17 controls the operation of the suction device 13A so as to suck out the gas in the honeycomb substrate 20 from its lower end portion (step S5). Thereby, the coating liquid 30 moves downward, and as shown in FIG. 8, a coating layer 30C made of the coating liquid 30 is formed on the wall of the honeycomb structure 22. Herein, the coating liquid is applied to the entire honeycomb structure 22, but the coating liquid may be applied only to the upper part of the honeycomb structure 22.

Next, the controller 17 controls the operation of the lifting device 16B so that the guide member 12 is moved upward (step S6). Specifically, the controller 17 controls the operation of the lifting device 16B so that the guide member 12 is moved from the second position to the first position.

Subsequently, the controller 17 controls the operation of the transport device 16A so that the holder 11 is moved from the coating device 10A to the second weighing scale 14B. The honeycomb substrate 20 is thus transported from the coating position (step S7).

As shown in FIG. 9, the second weighing scale 14B in which the coated honeycomb substrate 20 is placed on the weighing pan measures a total mass $M_s2$ of the honeycomb substrate 20 and the coating layer 30C (step S8). The second weighing scale 14B outputs a signal corresponding to the measurement result to the controller 17. The controller 17 stores the total mass $M_s2$ measured by the second weighing scale 14B.

Next, the controller 17 calculates a difference $M_s2-M_s1$ between the total mass $M_s2$ and the mass $M_s1$. The controller compares the difference $M_s2-M_s1$ with a lower limit value $M_sL$ and an upper limit value $M_sU$ stored in advance (step S9).

The controller 17 determines that the coating amount is appropriate if the difference $M_s2-M_s1$ satisfies the relationship represented by the following inequality.

$$M_sL < M_s2 - M_s1 < M_sU$$

The controller 17 determines that the coating amount may be inappropriate if the difference $M_s2-M_s1$ does not satisfy the relationship represented by the above inequality. In this case, the controller 17 controls the operation of the output device 19 so as to output warning information that can be recognized by the operator (step S10). In the manner described above, the processing by the manufacturing apparatus 1A ends.

Thereafter, the honeycomb substrate 20 coated in this manner is further subjected to one or more coatings as necessary. Then, the resultant is fired, obtaining an exhaust gas-purifying catalyst.

<1.3> Advantageous Effects

In the above-described honeycomb substrate 20, the honeycomb structure 22 is disposed in the cylindrical body 21 and at the position of the center section, and is not disposed in any end portion of the cylindrical body 21. The coating liquid can be applied to such a honeycomb substrate 20 by, for example, immersing one end portion of the cylindrical body 21 in the coating liquid, and sucking out the gas in the honeycomb substrate 20 from the other end portion. However, in this method, the coating liquid adheres to the portion of the cylindrical body 21 immersed in the coating liquid and to the region of the inner surface of the cylindrical body 21 from the portion immersed in the coating liquid to the honeycomb structure 22.

The portion of the coating layer formed on the outer surface of the cylindrical body 21 does not contribute to purification of the exhaust gas. The portion of the coating layer formed on the inner surface of the end portion of the cylindrical body 21 also cannot purify the exhaust gas as efficiently as the portion of the coating layer formed on the wall of the honeycomb structure 22. That is, if the proportion of the portion of the coating layer formed at the end portion of the cylindrical body 21 increases, the exhaust gas purification performance hardly improves, and the cost increases.

In a case where the cylindrical body 21 is made of metal, it is necessary to remove at least a part of the coating layer from the end portion of the cylindrical body 21 in order to prevent an obstacle to welding between the exhaust gas-purifying catalyst and other metal parts. Such an additional step also obstructs the cost reduction of the exhaust gas-purifying catalyst.

Furthermore, if the proportion of the portion of the coating layer formed at the end portion of the cylindrical body 21 increases, it is difficult to accurately grasp an amount of the portion of the coating layer formed on the wall of the honeycomb structure 22. That is, it is difficult to estimate from the coating amount whether the manufactured exhaust gas-purifying catalyst exhibits a performance as designed.

The coating liquid can be applied to the honeycomb substrate 20 by the same manufacturing apparatus and method as those described with reference to FIGS. 1 to 9 except that the diameter of the cylindrical portion of the guide member 12 is made equal to the diameter of the cylindrical body 21 and that the lower end surface of the cylindrical portion is brought into contact with the upper end surface of the cylindrical body 21. In this case, the coating liquid 30 can be prevented from adhering to the outer surface of the cylindrical body 21.

However, the present inventors have found that, in this case, the coating layer may be formed on a large part of the inner surface of the upper end portion of the cylindrical body 21. The present inventors consider the reason as follows.

Figure 10:
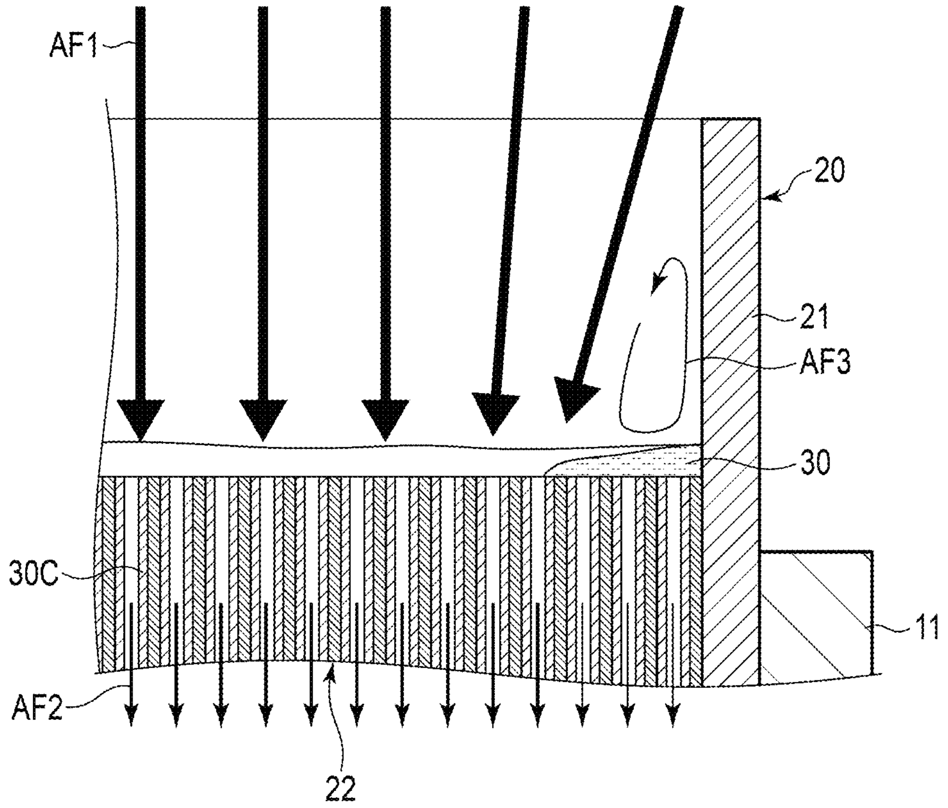
FIG. 10 is a cross-sectional view showing a suction step in a manufacturing method according to a comparative example.
Figure 11:
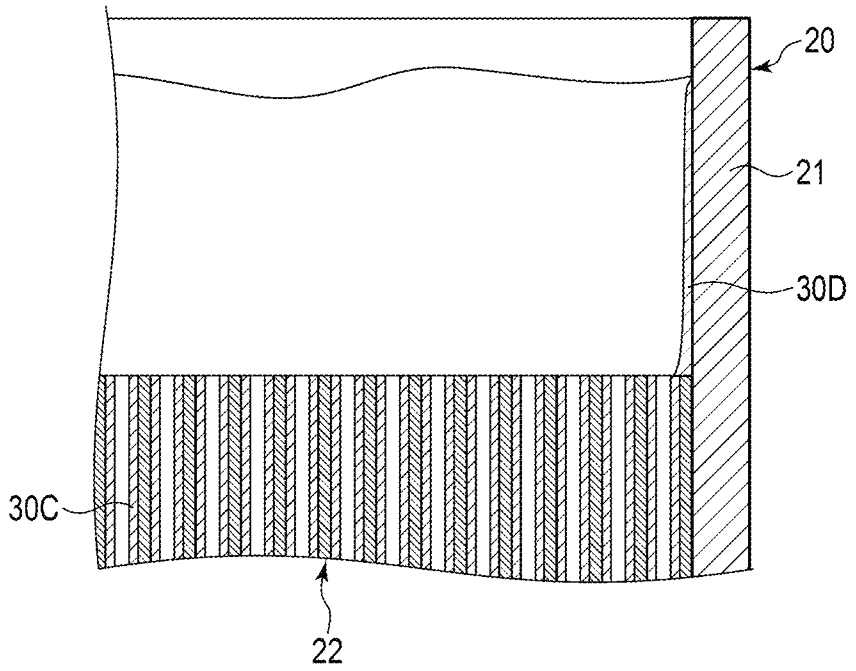
FIG. 11 is a partially enlarged cross-sectional view of an exhaust gas-purifying catalyst obtained by a manufacturing method according to the comparative example.

FIG. 10 is a cross-sectional view showing a suction step in a manufacturing method according to a comparative example. FIG. 11 is a partially enlarged cross-sectional view of an exhaust gas-purifying catalyst obtained by a manufacturing method according to the comparative example.

As described above, the coating liquid 30 supplied to the upper surface of the honeycomb structure 22 is drawn into the honeycomb structure 22 as the gas in the honeycomb structure 22 is sucked out from the lower surface side of the honeycomb structure 22. At a position of the upper surface of the honeycomb structure 22 in the vicinity of the cylindrical body 21, the moving speed of the coating liquid 30 into the honeycomb structure 22 is slower as compared with a position sufficiently distant from the cylindrical body 21. Therefore, as shown in FIG. 10, at the time when all the coating liquid 30 has moved into the honeycomb structure 22 at the position of the center portion of the upper surface of the honeycomb structure 22, the coating liquid 30 may remain on the peripheral portion of the upper surface of the honeycomb structure 22.

In this case, an airflow AF2 of a high-flow velocity is generated from the center portion of the upper surface of the honeycomb structure 22 toward the lower side, and in the upper end portion of the cylindrical body 21, an airflow AF1 flowing from the upper opening of the cylindrical body 21 toward the center portion of the upper surface of the honeycomb structure 22 is generated, and a vortex turbulence AF3 is generated in the vicinity of the peripheral portion of the upper surface of the honeycomb structure 22. By the turbulence AF3, the coating liquid 30 remaining on the peripheral portion of the upper surface of the honeycomb structure 22 is swirled up along the inner surface of the cylindrical body 21, and as shown in FIG. 11, a coating layer 30D may be formed on a large part of the inner surface of the upper end portion of the cylindrical body 21.

According to the manufacturing apparatus 1A and manufacturing method described with reference to FIGS. 1 to 9, as will be described below, it is possible to reduce a region in which the coating layer 30D is formed.

Figure 12:
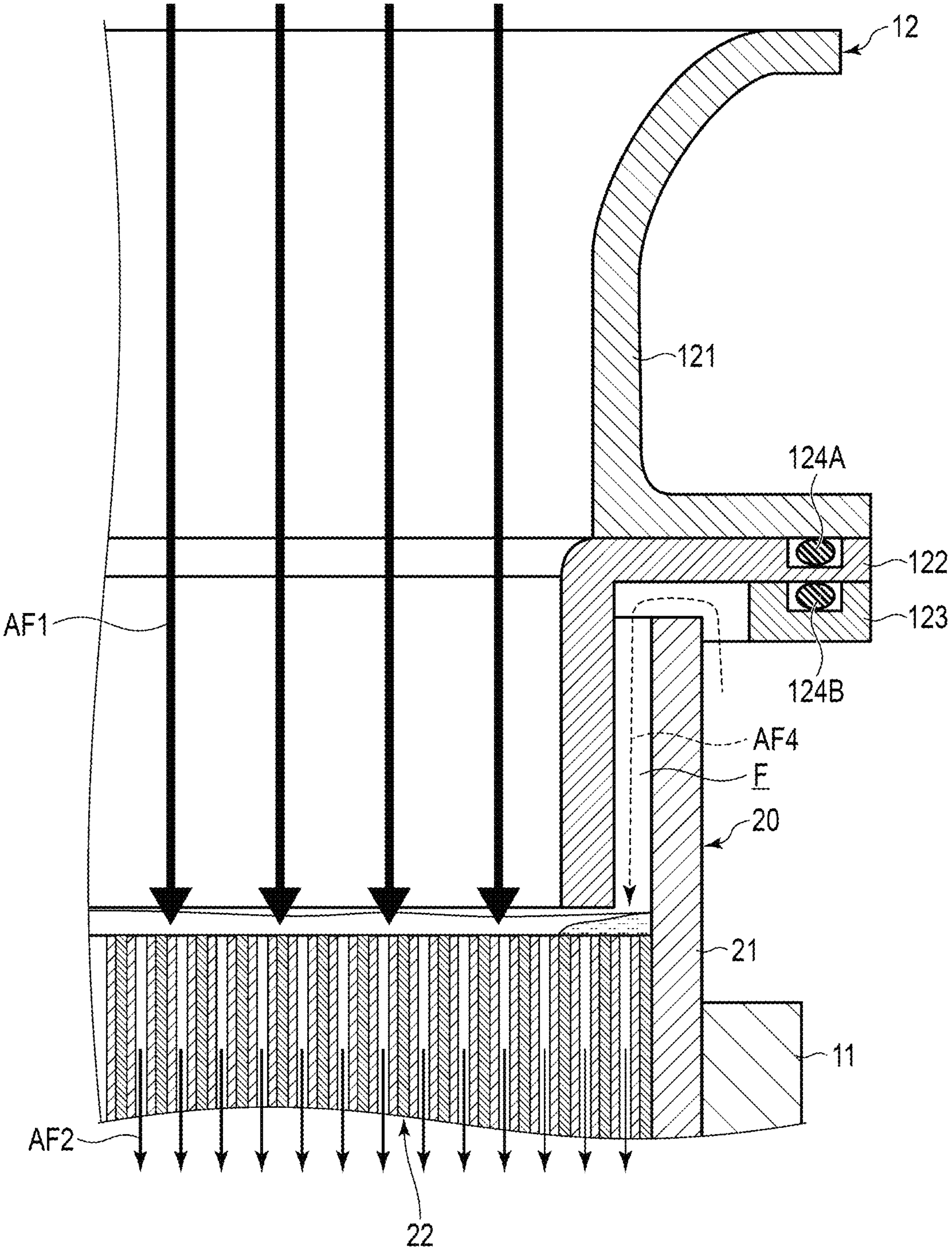
FIG. 12 is an enlarged cross-sectional view showing a state immediately before the end of the suction step in the manufacturing method according to the first embodiment.
Figure 13:
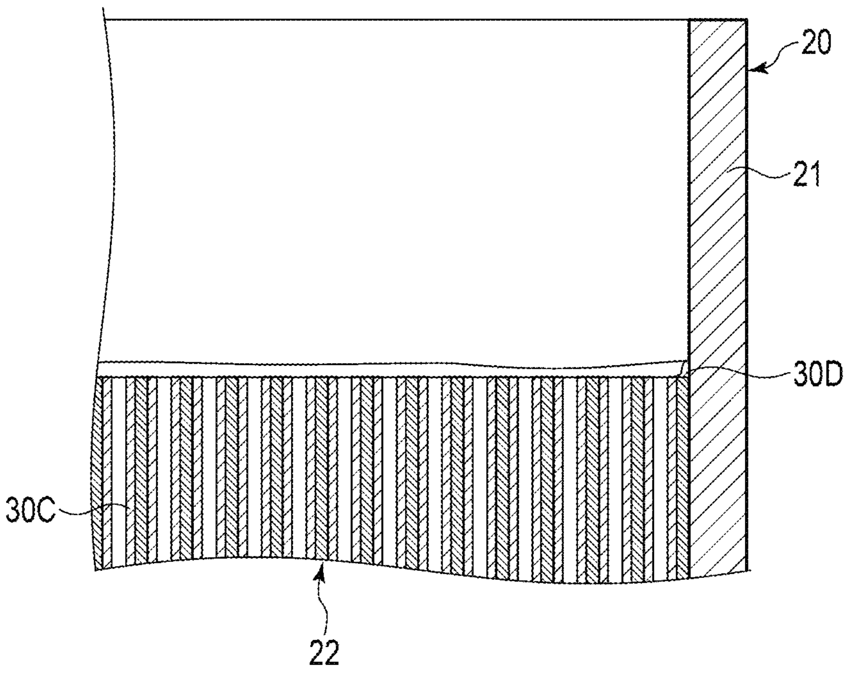
FIG. 13 is a partially enlarged cross-sectional view of an exhaust gas-purifying catalyst obtained by the manufacturing method according to the first embodiment.

FIG. 12 is an enlarged cross-sectional view showing a state immediately before the end of the suction step in the manufacturing method according to the first embodiment. FIG. 13 is a partially enlarged cross-sectional view of an exhaust gas-purifying catalyst obtained by the manufacturing method according to the first embodiment.

In the manufacturing apparatus 1A and manufacturing method described with reference to FIGS. 1 to 9, the coating liquid 30 is supplied and sucked out in a state in which the cylindrical portion of the guide member 12 is inserted in the upper opening of the cylindrical body 21. Upon the suction being performed, the coating liquid 30 supplied to the upper surface of the honeycomb structure 22 is drawn into the honeycomb structure 22 in the same manner as described above.

At a position of the upper surface of the honeycomb structure 22 in the vicinity of the cylindrical body 21, the moving speed of the coating liquid 30 into the honeycomb structure 22 is slower as compared with a position sufficiently distant from the cylindrical body 21. Therefore, as described above, at the time when all the coating liquid 30 has moved into the honeycomb structure 22 at the position of the center portion of the upper surface of the honeycomb structure 22, the coating liquid 30 may remain on the peripheral portion of the upper surface of the honeycomb structure 22. Therefore, as shown in FIG. 12, the airflow AF2 of a high flow velocity is generated from the center portion of the upper surface of the honeycomb structure 22 toward the lower side. Therefore, the high-speed downward airflow AF1 is generated in the first flow path.

On the other hand, since the second flow path has a larger airflow resistance than that of the first flow path, a pressure difference is generated between the second flow path and the first flow path. This generates an airflow AF4 of a low velocity flowing from the outside of the cylindrical body 21 toward the upper surface of the honeycomb structure 22. Therefore, very little of the vortex turbulence AF3 is generated in the vicinity of the peripheral portion of the upper surface of the honeycomb structure 22, and the coating liquid 30 is swirled up very little along the inner surface of the cylindrical body 21 by the turbulence AF3. The low-speed airflow AF4 described above may push down the coating liquid 30 adhering to the inner surface of the upper portion of the cylindrical body 21. Therefore, as shown in FIG. 13, almost no coating layer 30D is formed on the upper inner surface of the cylindrical body 21.

As described above, according to the manufacturing apparatus 1A and manufacturing method described with reference to FIGS. 1 to 9, it is possible to make the coating layer 30D difficult to form in the vicinity of the opening of the cylindrical body 21. Thus, it is possible to manufacture an exhaust gas-purifying catalyst at a low cost. Furthermore, by the mass measurement, it is possible to detect an abnormality in the manufacturing apparatus 1A at an early stage, and the accuracy of sorting products rejected by the mass measurement is improved, and therefore, quality control is facilitated.

<2> Second Embodiment

Figure 14:
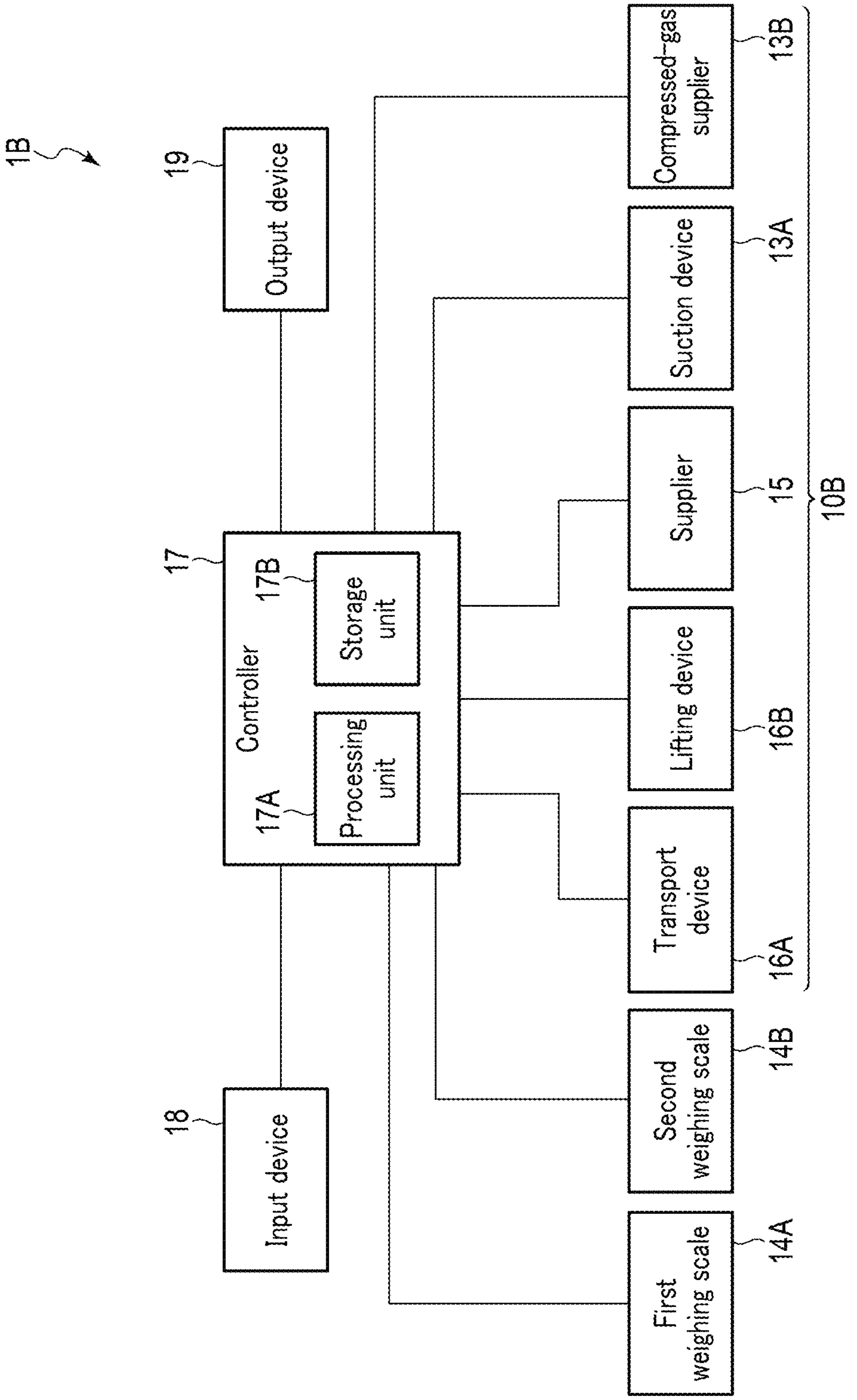
FIG. 14 is a block diagram of a manufacturing apparatus according to the second embodiment of the present invention.

FIG. 14 is a block diagram of a manufacturing apparatus according to the second embodiment of the present invention.

A manufacturing apparatus 1B shown in FIG. 14 is the same as the manufacturing apparatus 1A described with reference to FIGS. 1 to 9 except for the following points.

That is, the manufacturing apparatus 1B includes a coating device 10B instead of the coating device 10A. The coating device 10B is the same as the coating device 10A except for further including a compressed-gas supplier 13B.

The compressed-gas supplier 13B supplies a compressed gas, for example, compressed air, to the second flow path in the second state. Thus, the compressed-gas supplier 13B supplies the compressed gas to the upper surface of the honeycomb structure 22 in the second state. The compressed-gas supplier 13B includes a compressor.

The controller 17 controls the operation of the compressed-gas supplier 13B so that it starts the operation of supplying the compressed gas, for example, at the same time as the suction device 13A starts the suction, or after the suction device 13A starts the suction and before the suction device 13A stops the suction. Furthermore, the controller 17 controls the operation of the compressed-gas supplier 13B so that the compressed-gas supplier stops supplying the compressed gas after all the coating liquid 30 has moved from the upper surface of the honeycomb structure 22 into the honeycomb structure 22.

The manufacturing apparatus 1B and the manufacturing method using the same are the same as the manufacturing apparatus 1A and the manufacturing method using the same described with reference to FIGS. 1 to 9 except for the above-described points.

In a case where the compressed-gas supplier 13B supplies the compressed gas, by changing its operating conditions, the flow velocity of the airflow AF4 described with reference to FIG. 12 and the timing of generating the airflow AF4 can be adjusted. Therefore, in addition to the advantageous effects described in the first embodiment, the coating layer 30D can be made even less likely to be formed in the vicinity of the opening of the cylindrical body 21.

<3> Modifications

The above-described manufacturing apparatus and manufacturing method can be modified in various ways.

For example, one of the first weighing scale 14A and the second weighing scale 14B may be omitted. For example, the second weighing scale 14B may be omitted and the first weighing scale 14A may be used to measure the mass of the honeycomb substrate 20 before and after the coating.

In determination on appropriateness of the coating amount by the controller 17, the upper limit value and the lower limit value are set as threshold values, but only one of the upper limit value or the lower limit value may be set as a threshold value. For example, in determination on appropriateness of the coating amount by the controller 17, the difference $M_s2-M_s1$ may be compared with the lower limit value $M_sL$ without being compared with the upper limit value $M_sU$.

The determination on appropriateness of the coating amount by the controller 17 is not necessarily conducted. In this case, the first weighing scale 14A, the second weighing scale 14B, and the output device 19 can be omitted.

Placing the honeycomb substrate 20 on the weighing pan of the first weighing scale 14A may be performed automatically instead of manually.

The manufacturing apparatuses 1A and 1B may be modified to manually perform one or more of the operations they perform automatically. For example, the operations performed by one or more of the supplier 15, the transport device 16A, and the lifting device 16B may be modified to be performed manually. For example, the transport device 16A may be omitted and the holder 11 may be disposed at the coating position to be vertically movable so as to manually attach and detach the honeycomb substrate 20 to and from the holder 11.

The manufacturing apparatuses 1A and 1B may be modified so that part or all of the controls by the controller 17 are performed manually.

EXAMPLES

Examples of the present invention will be described below.

Example

An exhaust gas-purifying catalyst was manufactured by using the manufacturing apparatus 1A described with reference to FIGS. 1 to 3 and the method described with reference to FIGS. 4 to 9.

In the honeycomb substrate 20 used herein, the cylindrical body 21 had a circular cylindrical shape having an inner diameter of 40 mm, and the distance from each end surface of the cylindrical body 21 to the honeycomb structure 22 was 10 mm. Herein, the distance D1 was 1 mm, and the distance D2 was 1.5 mm. The distances D3 and D4 were both 1.5 mm.

The exhaust gas-purifying catalyst manufactured as described above was decomposed, and the formation state of the coating layer on the inner surface of the cylindrical body 21 was examined. Specifically, the distance from the end surface of the cylindrical body 21 facing upward during coating to the coating layer was measured at each position on the inner periphery of the cylindrical body 21. In addition, the proportion of the area of the part covered with the coating layer in the area of the region of the inner surface of the cylindrical body 21 within 5 mm from the end surface of the cylindrical body 21 facing upward during coating, i.e., the coverage, was examined.

The result was that the distance from the end surface of the cylindrical body 21 facing upward during coating to the coating layer was within a range of 5 to 6 mm, an average value of which was approximately 5 mm. The coverage was 0%.

Comparative Example

An exhaust gas-purifying catalyst was manufactured in the same manner as in the above Example except that the diameter of the cylindrical portion of the guide member 12 was made equal to the diameter of the cylindrical body 21, and that the lower end surface of the cylindrical portion was brought into contact with the upper end surface of the cylindrical body 21.

The exhaust gas-purifying catalyst manufactured as described above was examined for the formation state of the coating layer on the inner surface of the cylindrical body 21 in the same manner as in the above Example. The result was that the entire region within 5 mm from the end surface of the cylindrical body 21 facing upward during coating was covered with the coating layer.

REFERENCE SIGNS LIST

1A. Manufacturing apparatus
1B. Manufacturing apparatus
10A. Coating device
10B. Coating device
11. Holder
12. Guide member
13A. Suction device
13B. Compressed-gas supplier
14A. First weighing scale
14B. Second weighing scale
15. Supplier
16A. Transport device
16B. Lifting device
17. Controller
17A. Processing unit
17B. Storage unit
18. Input device

19. Output device
20. Honeycomb substrate
21. Cylindrical body
22. Honeycomb structure
30. Coating liquid
30C. Coating layer
30D. Coating layer
121. First member
122. Second member
123. Third member
124A. Seal material
124B. Seal material
131. Connection member
151. Nozzle head
AF1. Airflow
AF2. Airflow
AF3. Turbulence
AF4. Airflow
D1. Distance
D2. Distance
D3. Distance
D4. Distance
F. Gap

What is claimed is:

1. An exhaust gas-purifying catalyst-manufacturing apparatus for forming a catalytic layer on a honeycomb substrate, the honeycomb substrate including a cylindrical body and a honeycomb structure, the honeycomb structure being disposed in a center section of the cylindrical body and including a plurality of holes each extending in an axial direction of the cylindrical body, the manufacturing apparatus comprising:

a holder configured to hold the honeycomb substrate in an upright state;

a guide member including a cylindrical portion inserted into an opening of the cylindrical body positioned above the honeycomb structure such that the guide member is spaced apart from the honeycomb structure and the cylindrical body, the guide member having a first flow path allowing a supply of a coating liquid through an internal space of the cylindrical portion to an upper surface of the honeycomb structure, and the guide member forming a second flow path allowing a supply of gas via a gap between the cylindrical portion and the cylindrical body to the upper surface of the honeycomb structure;

a supplier configured to supply the coating liquid to the guide member;

a suction device configured to suck out gas in the honeycomb substrate from a lower end of the cylindrical body; and a controller controlling operations of the supplier and the suction device such that the supplier supplies the coating liquid to the guide member and the suction device sucks out the gas in the honeycomb substrate from the lower end of the cylindrical body when the cylindrical portion is inserted in the opening of the cylindrical body.

2. The manufacturing apparatus according to claim 1, further comprising a compressed-gas supplier supplying compressed gas to the second flow path.

3. The manufacturing apparatus according to claim 1, wherein the guide member further includes a flange portion protruding outward from an upper portion of the cylindrical portion, and a lower surface of the flange portion faces an upper end surface of the cylindrical body with a gap therebetween when the cylindrical portion is inserted in the opening of the cylindrical body.

4. The manufacturing apparatus according to claim 1, wherein the guide member further includes a diameter-enlarged portion, the diameter-enlarged portion being provided above the cylindrical portion, enlarged in diameter upward, and guiding the coating liquid into the cylindrical portion.

5. The manufacturing apparatus according to claim 1, further comprising a lifting device configured to raise and lower the guide member, wherein the controller controls operations of the lifting device, the supplier, and the suction device such that the supplier supplies the coating liquid to the guide member and the suction device sucks out the gas in the honeycomb substrate from the lower end of the cylindrical body in a state in which the lifting device has stopped raise and lowering of the guide member.

* * * * *